UNITED STATES PATENT OFFICE.

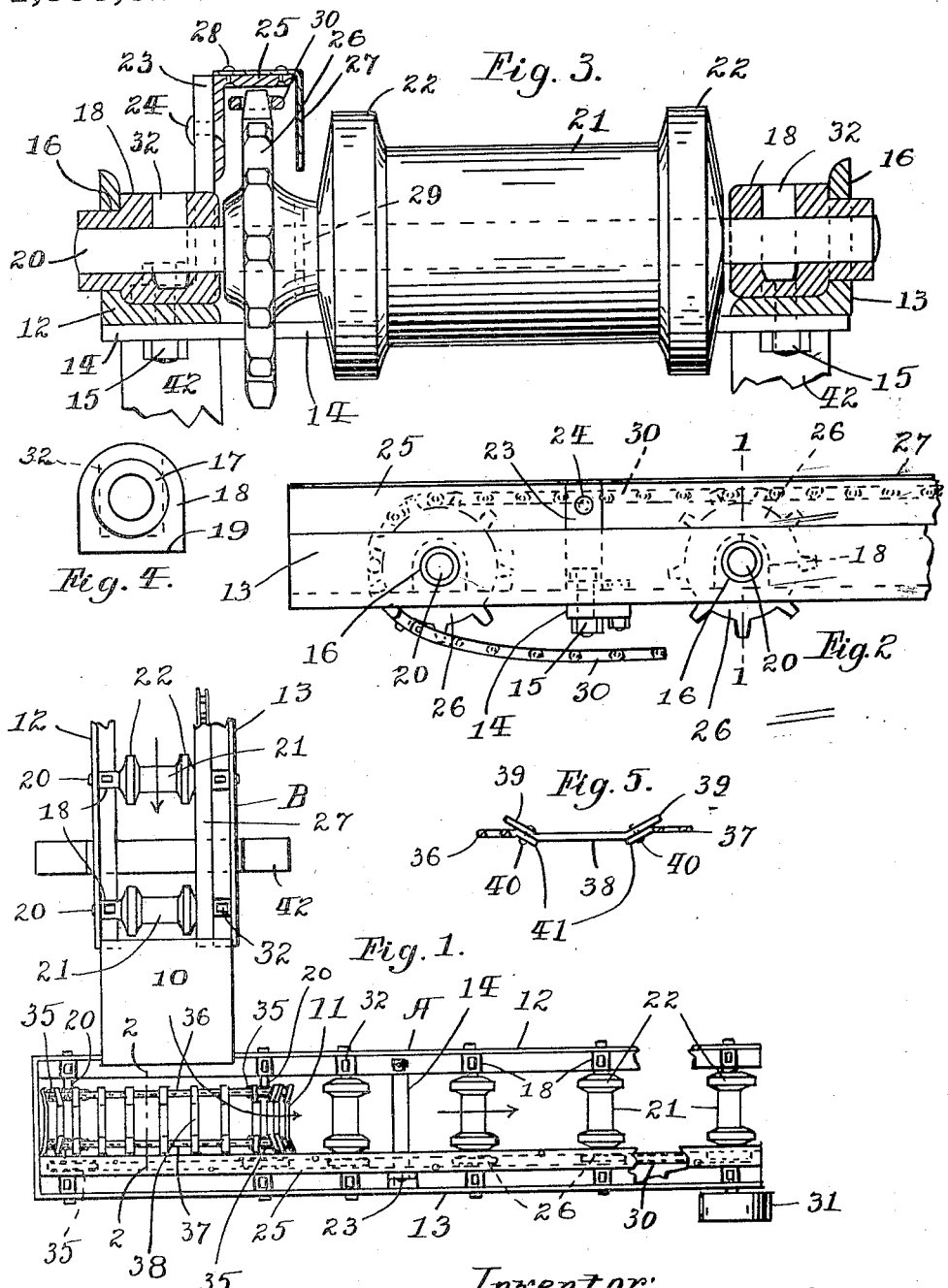

MELVIN OVESTRUD, OF STILLWATER, MINNESOTA, ASSIGNOR OF ONE-HALF TO TWIN CITY FORGE & FOUNDRY COMPANY, A CORPORATION OF MINNESOTA.

CARRIER.

1,333,821.     Specification of Letters Patent.     Patented Mar. 16, 1920.

Application filed May 13, 1918. Serial No. 234,122.

*To all whom it may concern:*

Be it known that I, MELVIN OVESTRUD, a citizen of the United States, residing at Stillwater, in the county of Washington and State of Minnesota, have invented a new and useful Improvement in Carriers, of which the following is a specification.

This invention relates to improvements in power carriers, the primary object being to provide a carrier having a series of rollers which are positively driven in an efficient manner to convey shells and other articles from place to place. A further object is to provide a carrier of the character stated in which a chain drive is employed, a single chain being adapted to travel over a series of sprockets which are connected with the rollers to be driven.

A further object is to provide in combination with such structure a housing which is adapted to hold the chain in mesh with the teeth of the sprockets and protect the chain and sprockets so as to reduce the hazard of anything catching in moving parts. A still further object is to provide in combination with the structure stated means for transferring articles from one length of carrier on to a transverse length of carrier, the articles being made to turn sharp corners in transit. With these and other objects in view my invention comprises the features of construction and combination of parts hereinafter particularly described and claimed.

In the accompanying drawing forming part of this specification, Figure 1 is a plan of carrier mechanism constructed in accordance with my invention; Fig. 2 is a side elevation of a detail of one of the carrier sections; Fig. 3 is a section taken on the line 3—3 of Fig. 2; Fig. 4 is an end view of one of the bearings in which each end of each roller shaft is journaled, and Fig. 5 is a section taken on the line 5—5 of Fig. 1 of one side of the link belt employed for assisting in causing the shells or other articles in turning a square corner between one length of carrier and a transversely arranged length of carrier.

In the drawings let A and B represent two lengths of carrier constructed in accordance with my invention, said lengths being arranged at right angles to each other and the length B a little higher in elevation than the length A. Interposed between the end of the length B and the side of the length A is a slide 10 down which the shells or other articles being conveyed are adapted to slide from the carrier B on to the carrier A. That portion of the carrier A adjacent to the lower end of the slide 10 is provided with a link belt conveyer 11 on to which the lower ends of the shells or other articles pass and are carried forwardly in the direction of the arrows indicated in Fig. 1, thus deflecting the shells longitudinally at right angles from the position in which they are advancing on carrier B into the position which they are made to assume on the carrier A. Thus the articles are made to turn square corners in transit, or can be deflected in their course at any angle desired.

With the exception of the feature stated, the carriers A and B are substantially alike in construction each consisting of a pair of longitudinal side rails 12 and 13 made out of angle members, the lower sides of which extend inwardly and are secured to transverse spacing members such as 14 by bolts 15 (see Fig. 2) or other suitable means. At spaced intervals throughout the length of the side bars and arranged oppositely to each other are pairs of circular openings 16 in the upstanding sides of the angle members 12 and 13. These openings receive and hold the circular ends 17 (see Fig. 4), bearings 18, which are placed on the angle members and are prevented from turning by their flat stability bases 19 which rest on the lower sides of the angle members. These bearings form journals for the ends of the shafts 20 which carry the bodies of the rollers 21. The surface of the body of each roller 21 is of any suitable configuration to carry the articles which are to be conveyed by the carrier. The form illustrated is one design in which the body portion is of less diameter than the ends 22, said ends acting as side guards to guide the articles in transit and prevent them from rolling off of the carrier. Part of the bolts 15 which secure the spacing rods 14 to the side member 12 also serve to secure upstanding brackets 23 (see Fig. 3) rigidly in place. Secured to the sides of these upstanding brackets by rivets 24 or other suitable means is a longitudinal angle member 25 having one of its sides projecting inwardly to assist in forming a housing which incloses the upper portions of sprocket wheels 26, there being one sprocket wheel mounted on the end of each shaft 20 nearest the side member 12. The housing mentioned is completed by another longitudinal angle member 27, which is secured by rivets 28 or other suitable means to the inwardly projecting side of the angle member 25 with its opposite side depending downwardly adjacent to the inner sides of the sprockets 26. This housing forms a hand guard. The sprockets 26 are secured to the shafts 20 by pins 29 or other suitable means. The sprocket wheels are driven by the upper side of a chain belt 30, the links of which mesh with the teeth of said sprockets, the lower side of said belt hanging loosely and said belt receiving initial power from any suitable source, that illustrated being a pulley 31 mounted on one of the shafts 20 of one of the carrier rollers. The upper side of the housing formed by the pair of angle members 25 and 27 lies sufficiently close to the periphery of the teeth of the sprocket wheels 26 to prevent the upper side of the belt 30 from disengaging said teeth. The housing also acts as a guard to hold the drive belt in mesh with the teeth of the sprocket and also to prevent clothing or anything from unintentionally catching between the teeth and the chain, thus reducing and preventing danger. The journal blocks 18 are formed with receptacles 32 in which lubricating medium may be placed from the shafts which carry the carrier rollers.

In operation the pulley 31 is revolved at suitable speed and power transmitted to each of the carrier rollers to positively drive them at even surface speed and advance shells or other articles from place to place. The conveyer belt 11 which is employed for assisting in causing the shells or other articles in transit to turn sharp corners consists of pairs of sprocket wheels 35 mounted upon each member of a pair of the shafts 20 in place of the carrier rollers 21. The shafts which carry the sprocket wheels 35 are driven in the same manner by sprockets such as are used on the shafts which carry the carrier rollers and by the drive belt 30, the only difference being that in the construction of the conveyer belt 11 a pair of link belts 36 and 37 traveling over the sprockets 35 have secured to them at closely spaced intervals transverse bars or flights 38 (see Fig. 5), which are fastened by upturned ends 39 and rivets 40 to ears or lugs 41 formed on the sides of the links of the belts 36 and 37. Thus an endless belt is produced of flights into the lap of which the shells or other articles are deflected during the forward movement of the upper side of the belt until the shells are turned at right angles and delivered longitudinally upon the driven rollers 21 of the carrier and conveyed forwardly. The construction described is simple and inexpensive and will with a small amount of power convey heavy articles from place to place. The structure described can also be erected on portable stands 42 conveniently for use and as many sections as desired joined end to end together to produce a carrier of any desired length and having a single chain belt drive.

In accordance with the patent statutes, I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. A carrier comprising a pair of longitudinal angle members spaced apart and having upstanding and horizontal sides, said upstanding sides being perforated, a series of carrier rollers disposed between said angle members, bearing blocks having reduced ends inserted through said upstanding sides and having stability bases resting upon said horizontal sides of said angle members and in which said rollers are journaled, alined sprocket wheels carried by said rollers for driving them, a chain belt having one side in mesh with the teeth of all of said sprockets for revolving the sprockets, and means for driving said chain.

2. In a carrier of the class set forth, a pair of transversely arranged carrier sections, each having a series of widely spaced driven roller members and arranged to deliver articles in transit from one onto the other, a slide at the end of the delivery carrier section extending to deliver on to the side of the receiving carrier section, an endless belt of closely arranged flights arranged to receive articles from the end of said slide and deflect their course longitudinally onto the series of rollers of the receiving section of said carrier, the carrier rollers of said receiving section and the belt of flights having alined sprockets for driving them, a chain belt having the links of one side in mesh with the teeth of said sprockets, a guard for holding the engaged side of said chain belt in mesh with said teeth, and means for driving said belt.

In testimony whereof, I have signed my name to this specification.

MELVIN OVESTRUD.